US012734568B2

(12) United States Patent
Kvapil et al.

(10) Patent No.: US 12,734,568 B2
(45) Date of Patent: Sep. 15, 2026

(54) METHOD AND KIT FOR REMEDIATION OF ENVIRONMENTS CONTAMINATED WITH HALOGENATED ORGANIC COMPOUNDS

(71) Applicant: PHOTON REMEDIATION TECHNOLOGY N.V., Amsterdam (NL)

(72) Inventors: Petr Kvapil, Liberec (CZ); Jaroslav Nosek, Liberec (CZ)

(73) Assignee: PHOTON REMEDIATION TECHNOLOGY N.V., Amsterdam (NL)

( * ) Notice: Subject to any disclaimer, the term of this patent is extended or adjusted under 35 U.S.C. 154(b) by 1007 days.

(21) Appl. No.: 17/918,663

(22) PCT Filed: Apr. 14, 2021

(86) PCT No.: PCT/EP2021/059674
§ 371 (c)(1),
(2) Date: Oct. 13, 2022

(87) PCT Pub. No.: WO2021/209504
PCT Pub. Date: Oct. 21, 2021

(65) Prior Publication Data
US 2023/0381842 A1 Nov. 30, 2023

(30) Foreign Application Priority Data
Apr. 14, 2020 (EP) .................................... 20169428

(51) Int. Cl.
*B09C 1/08* (2006.01)
*A62D 3/11* (2007.01)
(Continued)

(52) U.S. Cl.
CPC .............. *B09C 1/085* (2013.01); *A62D 3/115* (2013.01); *B09C 1/002* (2013.01);
(Continued)

(58) Field of Classification Search
CPC ..... B09C 1/085; B09C 1/002; B09C 2101/00; A62D 3/115; C02F 1/46114;
(Continued)

(56) References Cited

U.S. PATENT DOCUMENTS 6,214,202 B1 4/2001 McNab, Jr. et al.
6,255,551 B1 * 7/2001 Shapiro .................. B09C 1/002 204/519

(Continued)

FOREIGN PATENT DOCUMENTS

JP 2004-009025 A 1/2004
WO 2016/087461 A1 6/2016
WO 2019/046743 A1 3/2019

OTHER PUBLICATIONS

Japanese Reasons for Refusal Corresponding to 2022-562798 mailed Jan. 28, 2025.

(Continued)

*Primary Examiner* — Kyle Armstrong
(74) *Attorney, Agent, or Firm* — Secant IP, P.L.L.C.

(57) ABSTRACT

A method for remediation of environments contaminated with halogenated organic compounds, in particular per- and polyfluoroalkyl substances, the method comprising the steps of placing a plurality of electrodes in the contaminated environment, applying an electric direct current between said electrodes, providing at least one electrically conductive reductant for halogenated organic compounds, obtaining information indicative of the electrical resistance between said electrodes, analyzing said information to detect whether at least one of said electrodes introduced a lower electric current into the contaminated environment compared to the remaining ones of said electrodes and bringing said reductant into or in close proximity to the contaminated environment in response to said detection such that the electrical resistance to the contaminated environ- (Continued)

Figure 1A:
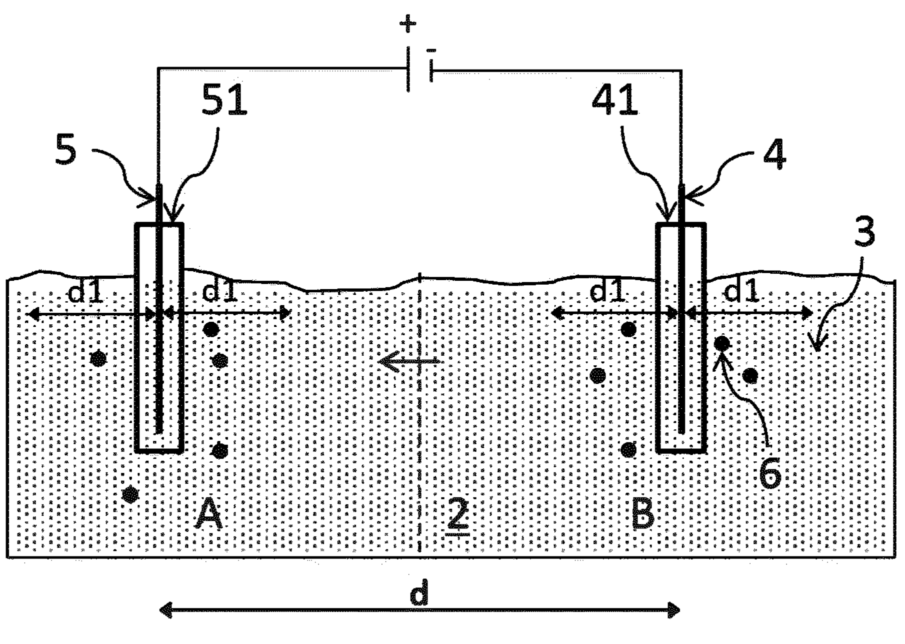

ment of at least one of said electrodes identified to introduce a lower electric current into the contaminated environment is decreased.

20 Claims, 4 Drawing Sheets

(51) Int. Cl.

| | |
|---|---|
| ***A62D 3/115*** | (2007.01) |
| ***B09C 1/00*** | (2006.01) |
| ***C02F 1/461*** | (2023.01) |
| ***C02F 1/467*** | (2023.01) |
| ***C02F 1/66*** | (2023.01) |
| *C02F 1/70* | (2023.01) |
| *C02F 101/36* | (2006.01) |
| *C02F 103/00* | (2006.01) |
| *C02F 103/06* | (2006.01) |

(52) U.S. Cl.

CPC ........ *C02F 1/46114* (2013.01); *C02F 1/4676* (2013.01); *C02F 1/66* (2013.01); *B09C 2101/00* (2013.01); *C02F 1/705* (2013.01); *C02F 2101/36* (2013.01); *C02F 2103/001* (2013.01); *C02F 2103/06* (2013.01); *C02F 2201/009* (2013.01); *C02F 2201/46115* (2013.01); *C02F 2201/4613* (2013.01); *C02F 2201/46135* (2013.01); *C02F 2201/4614* (2013.01); *C02F 2201/4617* (2013.01); *C02F 2209/06* (2013.01)

(58) Field of Classification Search

CPC .......... C02F 1/4676; C02F 1/66; C02F 1/705; C02F 2101/36; C02F 2103/001; C02F 2103/06; C02F 2201/009; C02F 2201/46115; C02F 2201/4613; C02F 2201/46135; C02F 2201/4614; C02F 2201/4617; C02F 2209/06

See application file for complete search history.

(56) References Cited

U.S. PATENT DOCUMENTS

| | | | | |
|---|---|---|---|---|
| 6,265,205 | B1 | 7/2001 | Hitchens et al. | |
| 8,048,317 | B2 | 11/2011 | Rima et al. | |
| 2006/0110218 | A1* | 5/2006 | Beyke | B09C 1/085 405/128.8 |
| 2014/0183054 | A1* | 7/2014 | Legzdins | C02F 1/4672 205/639 |

OTHER PUBLICATIONS

J. Moon et al., "Remediation of TCE-contaminated groundwater using zero valent iron and direct current: experimental results and electron competition model", Environmental Geology, (2005) 48, pp. 805-817 See International Search.

International Search Report Corresponding to PCT/EP2021/059674 mailed May 26, 2021.

Written Opinion Corresponding to PCT/EP2021/059674 mailed May 26, 2021.

* cited by examiner

METHOD AND KIT FOR REMEDIATION OF ENVIRONMENTS CONTAMINATED WITH HALOGENATED ORGANIC COMPOUNDS

The present invention relates to a method for remediation of environments contaminated with halogenated organic compounds, to a kit for performing remediation of environments contaminated with halogenated organic compounds and to the use of a kit for remediation of environments contaminated with halogenated organic compounds.

Halogenated organic compounds, also termed halocarbons, are chemicals in which one or more carbon atoms are linked by covalent bonds with one or more halogen atoms (fluorine, chlorine, bromine or iodine) resulting in the formation of organofluorine compounds, organochlorine compounds, organobromine compounds, and organoiodine compounds, respectively. Their use and misuse in industry and agriculture represent a large entry of these chemicals into the environment, resulting in widespread dissemination and oftentimes undesirable conditions, i.e. environmental contamination. Among others and in particular, contamination with perfluoroalkyl and polyfluoroalkyl substances (PFASs, also perfluorinated alkylated substances) has recently been a challenging issue for human health.

PFASs are a diverse class of anthropogenic organofluorine compounds that have multiple fluorine atoms attached to an alkyl chain. As such, they contain at least one perfluoroalkyl moiety ($C_nF_{2n}$). Many different PFASs exist and some of them have been used extensively in industrial, military, and consumer products, such as nonstick surfaces, electronics, performance plastics, carpets, fabric and paper coatings and aqueous film-forming foams (AFFFs).

Due to the high stability of the carbon-fluorine bond, together with relatively high solubility and mobility, PFASs are recalcitrant to chemical and biological reactions and, as a result, environmentally persistent. Numerous studies have demonstrated that PFASs are reproductive and developmental toxins, endocrine disrupters, possible carcinogens, bio accumulative, and that they have become ubiquitous.

Like PFASs, organobromine compounds (organobromides) are of great concern as contaminants in the environment due to their persistence, bioaccumulation and toxicity. As an important group of synthetic organobromine compounds, brominated flame retardants (BFRs) including polybrominated diphenyl ethers (PBDEs) are released into the environment during production, use and disposal of products containing the flame retardants.

Hence, the efficient removal of halogenated organic compounds, in particular PFASs, from affected environments is an important topic from a biological and environmental point of view.

Several approaches for the removal of halogenated organic compounds are known from the state of the art. For example, wastewater and drinking water treatment plants use traditionally carbon adsorption, ion exchange and reverse osmosis or nanofiltration but these means need to be frequently renewed or changed in order to effectively remove the aforementioned substances. Other removal methods use extreme conditions such as high temperature and pressure that are costly.

More recently, sorption processes of halocarbons onto carbonaceous materials, such as carbon nanotubes (CNTs), graphene, and powdered activated carbon (AC) have been studied, which occur through electrostatic and hydrophobic interactions. However, the need for further destruction of sorbed PFASs and sorbent regeneration limit the applicability of this approach.

Advanced reduction processes (ARPs) are a new treatment method that has been used successfully for the degradation of various halogenated organics.

Like oxidation processes, reduction processes involve either direct electron transfer to treat contaminants or the generation of reactive free species, such as a hydrogen radicals (H) and hydrated electrons ($e_{aq}^-$), which then degrade the contaminants.

Granular zerovalent iron (ZVI) or nanoscale zerovalent iron (nZVI) is a non-toxic, abundant and relatively inexpensive material that can serve as a sorbent and/or a reductant.

Generally, the removal of contaminants by ZVI in reductive processes involves the mass transfer of contaminants to the ZVI surface, their adsorption and/or reaction on or nearby the ZVI surface, and mass transfer of benign end products from ZVI into solution.

ZVI undergoes corrosion in the presence of water (Eqn. 1) and is further corroded under acidic conditions (Eqn. 2):

$$Fe(0)+2H_2O \rightarrow Fe(+II)+H_2+2OH^- \quad (1)$$

$$Fe(0)+2H^+ \rightarrow Fe(+II)+H_2 \quad (2)$$

Over time, ZVI may be converted to iron hydroxides and oxides based on the so-called Schikorr equations:

$$3Fe(+II)+2H_2O \rightarrow Fe(+II)+2Fe(+III)+H_2+2OH^- \quad (3)$$

$$Fe(+II)+2OH^- \rightarrow Fe(OH)_2 \quad (4)$$

$$Fe(+III)+3OH^- \rightarrow Fe(OH)_3 \quad (5)$$

$$3Fe(OH)_2 \rightarrow FeO+Fe_2O_3+2H_2O+H_2 \quad (6)$$

$$3Fe(OH)_2 \rightarrow Fe_3O_4+2H_2O+H_2 \quad (7)$$

As a result, ZVI particles feature an inner oxide shell of $Fe_3O_4$ and an outer shell of $Fe_2O_3$ surrounding the reduced iron core. The iron oxide shell acts as a site for sorption of contaminants, while the reduced iron core represents the anode and undergoes dissolution (Eqn. 8):

$$Fe(0) \rightarrow Fe(+II)+2e^- \quad (8)$$

Since there is almost no electron transfer at the $Fe_2O_3$ interface, further corrosion of the $Fe_2O_3$ shell to afford an increasingly porous iron oxide shell surrounding the reduced iron core must occur before electron transfer from the reduced iron core to PFASs becomes possible. Corrosion of iron oxides occurs via the following reactions in order to reach equilibrium with the anode reaction (Eqn. 8):

$$Fe_2O_3+6H^++2e^- \rightarrow 2Fe(+II)+3H_2O \quad (9)$$

$$Fe_3O_4+8H^++2e^- \rightarrow 3Fe(+II)+4H_2O \quad (10)$$

For example, U.S. Pat. No. 8,048,317 B2 discloses the use of zerovalent iron and other metals coupled with oxygen gas to degrade chlorinated and non-chlorinated organic compounds in aqueous solutions. However, the method cannot be successfully applied for the remediation of environments contaminated with PFASs as fluorinated organics are unreactive towards hydroxyl free radicals.

Another technology that has received much attention is electrokinetic remediation.

In situ electrokinetic remediation (electroremediation) typically involves the application of a voltage difference across electrode pairs placed over a considerable extent of a contaminated environment, typically tens or even hundreds of meters, and over a considerable duration of time, typically months or even years. In order to make such a process economically viable it is desirable to use as few and as simple electrodes as possible and to pass as high currents as usefully possible through these electrodes. Also, a considerable amount of electric energy is used. It is desirable that this energy should be used efficiently as possible.

The term "electrokinetic" comprises all electrically induced mass transport processes, including the flow of fluids and the movement of charged particles and ions towards the electrodes. Fundamental transport mechanisms caused by an electric field are electroosmosis, i.e. movement of liquid relative to a charged stationary surface, electromigration, i.e. transport of charged ions or ion-complexes in solution, and electrophoresis, i.e. movement of charged particles/colloids relative to a stationary fluid.

During electroremediation not only mass transport processes but also electrode reactions take place. Water is electrolyzed with oxygen and protons being formed at the anodes and hydrogen and hydroxyl ions being formed at the cathodes:

$$\text{Anode: } H_2O \rightarrow 2H^+ + \tfrac{1}{2}O_2 + 2e^- \quad (11)$$

$$\text{Cathode: } 2H_2O + 2e^- \rightarrow 2OH^- + H_2 \quad (12)$$

Migration of ions proceeds along the current flow lines between the electrodes and perpendicular to the arising equipotential surfaces, respectively, whereby positive ions move towards the negatively charged cathode while negative ions are attracted to the positively charged anode.

The electric dipole field generated by the electrodes in the system can be visualized by mapping the equipotential lines between said electrodes with a computer. The single electric fields generated by each electrode pair superimpose each other, which leads to areas between the cathodes and anodes where no or only a very small electric gradient exists. Within these areas of low electric gradient, electromigration rates are low and hydraulic convection may dominate. The electric gradient is linear and steepest in the zone directly between oppositely charged electrodes. Hence, electromigration rates are highest in this zone.

In existing commercial electrokinetic systems, contaminants are commonly extracted by a secondary recovery system or deposited at the electrodes. For example, WO 2019/046743 discloses devices, systems and methods for removing contaminant ions from water within an aquifer. Electroremediation is employed to induce migration of ionic contaminants towards the electrodes, where the contaminants can be concentrated and removed from the aquifer. However, such techniques only lead to a concentration of the contaminants in the medium and not to their decomposition into harmless or at least less hazardous substances.

Other technologies are technically complex and require the use of expensive catalysts. For example, U.S. Pat. No. 6,255,551 B1 discloses an electrokinetic remediation method and system for treating media contaminated with halogenated hydrocarbons, in particular chlorinated solvents. The method comprises a step of detecting a non-uniform electrical conductivity or electroosmotic permeability in a contaminated media and selectively applying an electric field to the contaminated media by emplacing one or more segmented electrodes proximate the contaminated media. Each segmented electrode comprises a plurality of conductive segments each separated by an insulating segment and coupled to an electric source that is capable of separately applying a respective electric current to each conductive segment, which renders such segmented electrodes technically complex and rather expensive.

U.S. Pat. No. 6,214,202 describes a method for groundwater remediation by catalytic reductive dehalogenation facilitated by water electrolysis with an electrode pair or array. The contaminated groundwater and dissolved hydrogen, originating from water electrolysis, are pumped through a palladium-containing catalyst bed, which renders the process expensive. After passing through the catalyst bed, the groundwater is extracted from the environment and reinjected into the ground via a dedicated wellbore, which adds to the complexity of the process.

U.S. Pat. No. 6,265,205 B1 discloses a method for enhancing the rate of biodegradation of chlorinated organic compounds by providing hydrogen to the environment. In one embodiment, an electric field is used to induce a horizontal transport of pore fluid which causes hydrogen gas and other electron donors to migrate between the electrodes. In an alternative embodiment of the same publication, metal particles are used to produce hydrogen through corrosion reactions in situ. The metal particles are introduced into the ground water at any point in the soil.

However, the methods known from the state of the art remain silent about the role of the distance between any added reducing agent and the electrodes. Furthermore, most of the methods known today are not aimed at the removal of PFASs from contaminated environments or do not mineralize PFASs completely but produce short-chain decomposition products with unknown toxicity.

It is the object of the present invention to overcome these and other disadvantages of the prior art and in particular to provide an improved electrokinetic method for the remediation of environments contaminated with halogenated organic compounds, in particular PFASs, which is cost-effective, reliable and easy to perform.

The object is achieved by a method for remediation of environments contaminated with halogenated organic compounds, in particular PFASs, a kit for performing remediation of environments contaminated with halogenated organic compounds and the use of a kit for remediation of environments contaminated with halogenated organic compounds pursuant to the independent claims.

According to the present invention, the method for remediation of environments contaminated with halogenated organic compounds comprises the steps of placing a plurality of electrodes in the contaminated environment, supplying an electric direct current through said electrodes, obtaining information indicative of electrical resistances between said electrodes, analyzing said information to detect whether at least one of said electrodes introduces a lower electric current into the contaminated environment compared to the remaining ones of said electrodes, providing at least one electrically conductive reductant for halogenated organic compounds, characterized by bringing said at least one reductant into or in close proximity to the contaminated environment in response to said detection such that the electrical resistance to the contaminated environment of at least one of said electrodes identified to introduce a lower electric current into the contaminated environment is decreased.

Surprisingly and in contrast to earlier disclosures which focused on electrokinetics or reductive species only, efficient and effective mineralization of halocarbons is achieved with the method according to the invention, in particular involving the spatially defined deployment of an electrically conductive reductant in combination with controlled electrokinetics. The introduction of the conductive reducing agent also makes it possible to increase the distance between the deployed electrodes, thereby allowing to reduce the overall number of electrodes required to cover any given area. In addition, the method disclosed herein allows the reducing agent to be deployed specifically and in the required quantity based on the local conditions and the progress of the remediation process.

The determination of the resistance increase at or near the surface of the electrodes can be realized in various ways. For example, when each of the anodes supply a controlled current $I_A$ an indication of the resistance of the cathode $R_C$ plus that of the environment $R_{Environment}$ between said anode and said cathode can be obtained from the voltage difference UAC between said cathode and said anode according to equation (13).

$$(R_{Environment} + R_C) = \frac{U_{AC}}{I_A} \tag{13}$$

If one of the current or the voltage is kept constant, the resistance need not even be determined explicitly, since in this case the variable other one of the current or voltage is indicative of resistance if voltage or current is kept constant respectively.

The information indicative of electrical resistance between a respective anode-cathode pair is used to trigger the deployment of the electrically conductive reductant.

In particular, the method for remediation of environments contaminated with per- and polyfluoroalkyl substances (PFASs) comprises the steps of placing a plurality of electrodes in the contaminated environment, supplying an electric direct current through said electrodes, obtaining information indicative of electrical resistances between said electrodes, analyzing said information to detect whether at least one of said electrodes introduces a lower electric current into the contaminated environment compared to the remaining ones of said electrodes, providing at least one electrically conductive reductant for per- and polyfluoroalkyl substances, and bringing said at least one reductant into or in close proximity to the contaminated environment in response to said detection such that the electrical resistance to the contaminated environment of at least one of said electrodes identified to introduce a lower electric current into the contaminated environment is decreased.

Surprisingly, it was found that, although neither the use of electrokinetics nor reductants on their own would result in a reduction of PFASs, the combination of electric direct current and an electrically conductive reducing agent would allow an effective and efficient reduction of PFASs. In the method described herein, the reductant is deployed based on information about electrical resistances, i.e. in a targeted manner, in order to enhance electrokinetics, optimize the use and consumption of reductant, and thus increase the effectiveness and efficiency of the remediation process.

The term "reductant for halogenated organic compounds" as used herein refers to a chemical substance, a mixture of substances or a material which is capable of either direct electron transfer to treat contaminants or the generation of reactive free radicals, which then degrade contaminants. In combination with its electrical conductivity, the reductant increases the effective surface of the electrodes and their working radius.

Optionally, the reductant can migrate under the influence of an electric field between oppositely charged electrodes, thereby enriching halogenated organic compounds from liquid mixtures at its interface and transporting said substances to an electrode, preferably to the cathode, for electrochemical degradation.

A reductant capable of migration under the influence of hydraulic gradient and/or an electric field between oppositely charged electrodes increases the effective range of the remediation technique and, at the same time, contains a further spread of the contaminants by adsorption.

Generic drinking water targets are typically in the parts per trillion (ppt) or nanograms per liter (ng/L) range.

The term "contaminated environment" as used herein refers to an environment in which the sum of halogenated organic compounds exceeds a maximum concentration prescribed by the authorities for a given location. If not regulated by the relevant authorities, the term "contaminated environment" refers to an environment in which the sum of halogenated organic compounds exceeds a concentration of 500 ppt and/or in which the concentration of perfluorooctanoic acid (PFOA) and perfluorooctane sulfonic acid (PFOS) exceeds 100 ppt, respectively.

For example, the European union's 1998 Drinking Water Directive states a legally binding drinking water limit of 100 ppt for 20 compounds in the vast PFAS family of chemicals, including PFOA and PFOS, and a maximum of 500 ppt for the sum of PFASs. The US Environmental Protection Agency has recently established a non-enforceable health advisory level of 70 parts per trillion (ppt) for the sum of perfluorooctanoic acid (PFOA) and perfluorooctane sulfonic acid (PFOS) and 300 to 7000 ng/L for $C_4$-$C_7$ PFASs.

The method described herein can be carried out in situ or ex situ.

In situ remediation has the advantage that no expensive excavation, removal, or disposal costs are incurred which can be significant.

Ex situ remediation of contaminated environments can be a particularly viable option when contamination concentration levels are very high, where the contaminants themselves are particularly recalcitrant, or where the time frame for cleanup is short. Remediation of contaminated environments ex situ can be performed on site in order to avoid costly transportation.

Preferably, the contaminated environment is selected from the group consisting of wastewater, groundwater, industrial effluents, sediments, soil, hazardous liquid wastes, environmental runoffs and processing byproducts or combinations thereof.

The term "in close proximity" as used herein refers to a position in which the reductant can interact with the contaminants right away or at least no further action is required for interaction of the agent with the contaminants to occur at a later point in time. Depending on the environment, this typically implies a distance of not more than 1 m, preferably not more than 0.1 m from the contaminated environment.

The electrodes used in conjunction with this invention may be positioned directly in the contaminated environment or inserted into wells or within trenches in fluid communication with the contaminated environment.

Depending on the local conditions in the contaminated environment, particularly depending on the conductivity of the environment to be remediated, the electrodes can be positioned at a distance between 30 cm and 5 meters from each other, preferably between 30 cm and 3 meters.

The electrodes that can be used in this invention may have a variety of shapes, such as rods or flat sheets. The electrode wells may have a variety of geometries as well.

In any particular case, a multiplicity of anodes and cathodes may be used and it is possible to simultaneously use dozens of electrodes at a single site. The current and voltage are chosen in conjunction with the electrical conductivity of the contaminated environment. Typically, depending on electric properties such as resistivity, a voltage ranging between 10 V and 60 V is employed and the power introduced into a field measuring 10 by 10 meters is about 3 kilowatts.

Electrodes that are inert to anodic dissolution are preferably used in electroremediation. Example electrode materials include graphite, platinum, gold, silver, $IrO_2$, $RuO_2$ as well as boron-doped diamond (BDD), $Ti/SnO_2$, $Ce/PbO_2$, $Ti/RuO_2$, and substoichiometric- and doped-$TiO_2$, although less expensive electrodes made from titanium or stainless steel can be employed as well.

In contrast to the negatively charged hydroxyl ions which tend to precipitate on the cathode, the protons formed at the anode migrate efficiently towards the cathode in the electric field. The resulting acidic front (due to excess $H^+$ ions, see Eqn. 11) can aid in contaminant removal by solubilizing certain types of contaminants to form ionic species that are readily transported via electromigration. Since the zeta ($\zeta$) potential of a particle, i.e. its apparent surface charge, has been shown to strongly depend on solution pH, the acidic front can also help to render the zeta potential of the reductant more positive, thereby enhancing its electromigration towards the cathode.

Preferably, said at least one reductant is brought into or in close proximity to the contaminated environment at a distance of less than 50 centimeters, more preferably at a distance of less than 30 centimeters, from at least one of the electrodes identified to introduce a lower electric current into the contaminated environment compared to the remaining electrodes.

It has been found that by introducing the conductive reducing agent within a defined distance from the electrodes, the effective range of the electrodes can be increased by the electrically conductive reducing agent, which allows the electrodes to be spaced further apart and the overall number of electrodes required for any given to be reduced. This reduces CAPEX and renders the overall method more cost effective. The reductant enhances the electrical conductivity of the contaminated environment, which facilitates the electrokinetic processes in the contaminated environment and increases reduction rate and the mobility of the contaminants. By introducing the reductant in the contaminated environment where is has the most favorable effect, i.e. in areas of the environment with high resistivity preventing effective coverage by the DC electric field, the overall efficiency of the method is increased and the use of costly reducing agents can be limited.

The term “effective range of the electrode” as used herein refers to the sphere around the electrodes where electrochemical reactions originating from the electrode can take place.

Preferably, the method described herein further comprises the steps of placing a plurality of measuring electrodes in the contaminated environment, measuring a voltage drop between said measuring electrodes and/or from each of the measuring electrodes to its respective nearest electrode, and obtaining the information indicative of electrical resistances from the measured voltage drops.

By using measuring electrodes in addition to the electrodes, the electrical resistance of the contaminated environment can be determined between the measuring electrodes or between a measuring electrode and an electrode. This makes it possible to determine the electrical resistance in the contaminated environment with higher spatial resolution.

The electric field can be studied using means for measuring the DC electric field capable of recording introduced current and measured voltage, such as a grid of probes and/or by the electrodes used in the method described herein, i.e. said electrodes may be properly functioning anodes or cathodes used for remediation. Alternatively, said probes can be electrodes dedicated for measuring current and voltage data, for example. Ideally, the probes and/or electrodes are arranged as closely as possible to improve the resolution of the measurement and should cover the entire environment to be remediated in at least one expansion plane.

The method according to the invention disclosed herein preferably further comprises the steps of:

- Placing means for measuring the DC electric field, in particular at least one reference electrode and at least one measuring electrode, in the contaminated environment; and
- Measuring the electric field produced by said electric direct current applied between said electrodes, in particular measuring the potential difference between said reference electrode and said at least one measuring electrode.

By placing at least one reference electrode and at least one measuring electrode in the contaminated environment and measuring voltages and/or currents between said electrodes in a region where constant electric currents run through the contaminated environment, an indication of the resistance of the contaminated environment can be obtained and the attribution of the contaminated environment to the resistance from the cathode to the anode may be calculated therefrom.

Often it may be assumed that the contaminated environment responds similarly at different locations in the treated area, and in this case said at least one reference electrode and said at least one measuring electrode need not be located near the anode and/or cathode for which the resistance is determined. Thus, one pair of measuring electrodes may be used to obtain information indicative of electrical resistances between a plurality of different cathodes and/or anodes.

By placing at least one measuring electrode and/or electrode in a location where the electric potential applied between the electrodes used in the method described herein verges on zero, which renders the respective electrodes reference electrodes, and by placing the remaining at least one probe and/or electrode in the area of the electric field to be examined, the potential difference between the probes and/or electrodes as well as the shape of equipotential and current lines over the studied area can be obtained. It is apparent that, in the case where the means for measuring the DC electric field comprise electrodes used in the method described herein, the electrode placed in a location where the electric potential verges on zero is used for measuring the DC electric field only and is not actively forming the electric field.

Measuring the potential difference over the studied area gives basic data for the interpretation of the shape of the DC field.

In one embodiment, the method described previously further comprises the steps of determining the electric field lines and/or equipotential lines between the electrodes, preferably between the electrodes and/or measuring electrodes, and switching the polarity of at least one of said electrodes and/or placing at least one additional electrode in the contaminated environment based on said determined electric field lines and/or equipotential lines, in particular to increase the area of the contaminated environment covered by the electric field and/or to enhance the electric intensity in a given region of the contaminated environment.

Switching the polarity of select electrodes and/or the introduction of additional electrodes into the contaminated environment has the advantage that the largest possible area of the contaminated environment is under the influence of the electric field, which increases the effectiveness of the remediation process.

For example, it may be desirable to switch the polarity of one or more electrodes if a high potential gradient, e.g. due to the increased presence of deposits, has been detected around said one or more electrodes in the course of interpreting the measurement results.

By altering the distribution of the electric field, the location of voltage gradients, the velocity rate and the direction of travel of contaminants can be controlled, which increases the overall effectiveness and the efficiency of the remediation method disclosed herein.

From the shape of the equipotential and current lines, it is also possible to draw conclusions regarding the distribution of contaminants in the contaminated environment over the remediation period.

For example, lower potential gradients develop in fine-grained soils with high ion concentrations and electric conductivity, whereas higher potential gradients develop in coarse-grained soil with low ion concentrations and electric conductivity. The development of a higher voltage gradient, i.e. an increase of electric resistance, can be explained by the depletion in ions caused by electromigration towards the respective electrodes, precipitation reactions, as well as the development of a waterfront resulting from the reaction of the products of water electrolysis (cf. equations 11 and 12). It is apparent for a person skilled in the art that the method described herein is not limited to PFASs but universally applicable and particularly suitable to control and optimize the distribution of the electric field throughout the contaminated environment and to follow the remediation progress of PFASs and other contaminants as well.

The mapping of the DC electric field described herein can be performed repeatedly, whereby the frequency of the measurements depends on the targeted contaminant degradation rate.

In the case of PFASs, the inventors have found in laboratory experiments that a 75 to 90% removal of PFASs occurs within approximately 2 weeks of remediation. After this time it may be appropriate to switch the polarity of the electrodes or to modify the arrangement of cathodes and anodes used in the method described herein.

In a preferred embodiment, the measuring electrodes are arranged in such a way that one measuring electrode is placed at a location where the electric potential verges on zero potential, i.e. a reference electrode, and the remaining measuring electrodes are distributed over the area to be remediated, whereby the number and position of the electrodes are not changed over the course of the remediation.

This has the advantage that the position of all the working electrodes and measuring electrodes used in the remediation method described herein is determined from the beginning and no additional work is required during the course of the remediation due to the repositioning of said electrodes, which also enables remote control of the procedure, for example.

Reversing or switching the direct current flow path, i.e. the polarity of at least one of multiple electrodes, promotes multiple contaminant passes through the treatment zones comprising the reductant and rejuvenates the electrodes. In the case of a cathode, for example, a switch in polarity allows acids to remove any precipitated mineral deposits causing an increase in resistance. In addition, the electromigratory pathway of the contaminants can be altered to retain any residual PFASs in areas of the contaminated environment that were previously not covered by the electric field.

Preferably, the measurements are interpreted by graphically representing, and optionally interpolating and/or extrapolating, the measured and/or simulated data by means of a computing system.

For example, the measured current and volt data can be plotted in a diagram against the position or distance of the electrodes introduced into the contaminated environment or against the width and length of the environment to be remediated.

This way, it is possible to visualize the distribution and the developing of the electric field, i.e. equipotential and current lines, especially interactions and differences between the electric fields generated by the electrodes in two dimensions. In particular, the areas of the environment to be remediated that are covered by the DC electric field or not covered by the DC electric field, respectively, can be identified.

If so indicated by the information thus obtained, the DC electric field is optimized by switching the polarity of said at least one anode and/or at least one cathode and/or placing at least one additional anode and/or at least one additional cathode in the contaminated environment to change the distribution of the electric field in the contaminated environment.

Preferably, the method described previously further comprises the step of measuring the pH of the environment within the effective range of the anode and/or cathode.

During electrolysis, water in the immediate vicinity of the electrodes can be electrolyzed to generate $H^+$ ions at the anode and $OH^-$ ions at the cathode, causing the pH of the water to change according to equations 11 and 12. If the ions produced are not neutralized or removed, these reactions lower the pH at the anode and raise the pH at the cathode, whereby an increase of pH can cause precipitation and deposition of insoluble minerals at or in the vicinity of the cathode, thereby forming regions of high electrical resistance and low electroosmotic flow.

By measuring the pH, redox potential, conductivity and temperature of the environment within the effective range of the electrodes, it is possible to monitor the operation of the electrodes and speed up the remediation process as much as possible by identifying a maximum sustainable electric current that can be supplied without endangering the proper operation of the electrode system.

Optionally, a pH adjusting agent can be added within the effective range of the anode and/or cathode.

Adjusting the pH value within the effective range of the electrodes extends their service life and allows the degradation of PFASs to take place under optimal pH conditions.

Preferably, a pH adjusting solution is added within the effective range of the anode and/or cathode.

This has the advantage that the pH adjustments can be done easily and precisely, for example by using a conventional dosing pump.

Preferably, the method described previously further comprises the steps of providing at least one monitoring well in the contaminated environment and at least one sensor per monitoring well capable of measuring at least one chemical property and/or at least one physical property.

The term "monitoring well" as used herein refers to an access to the contaminated environment through which the at least one sensor can be brought in fluid communication with the medium to be remediated. In addition, samples can also be taken from these monitoring wells.

The provision of at least one monitoring well with at least one sensor each to probe the contaminated environment makes it possible to continuously monitor the function of the system and to determine the progress and the end point of the remediation process.

Preferably, the physical and/or chemical properties to be monitored in the method described previously are selected from the group consisting of fluoride, hydrogen fluoride, bromide, hydrogen bromide, chloride, hydrogen chloride, oxidation reduction potential, temperature, pH, conductivity or electrical resistance.

The fluoride concentration can be used as an indicator for the degradation and mineralization of PFASs, i.e. remediation progress. Analogously, the bromide and chloride concentrations can be used as an indicator for the degradation and mineralization of organobromine compounds and organochloride compounds, respectively. Monitoring the concentration of hydrogen fluoride and/or hydrogen bromide and/or hydrogen chloride is beneficial in terms of the safety of the operation. Temperature measurements can be used to correlate with the resistance or conductivity of the contaminated environment. The pH/ORP readouts can be used to adjust the pH/ORP for optimum reducing conditions. Measuring the conductivity or electric resistance can serve as an indicator for the state of the electrodes.

Preferably, the reductant in the method described previously comprises a zerovalent metal. Zerovalent metals have the advantage of being readily commercially available.

Preferably, the zerovalent metal used in the method described herein is coated by inorganic sulphur-based structures.

Sulfidation (or sulfidization), i.e. the modification or transformation of a metal-based material by exposure to sulfur compounds of various oxidation states, can play a significant role in the overall reactivity of ZVI with contaminants as it attenuates the problem of surface passivation with oxide and hydroxide species originating from the competing reaction of ZVI with water. Although numerous metals with strong affinities for sulfide exist, iron is by far the most prominent one with common forms of iron sulfide minerals including mackinawite (FeS), greigite ($Fe_3S_4$), pyrite ($FeS_2$) and pyrrhotite ($Fe_{1-x}S$).

Sulfidated ZVI particles are more stable in water than uncoated ZVI due to the inhibition of ZVI aggregation by electrostatic repulsion. This way, the longevity of the zerovalent metal and the effectiveness of the resulting species in the remediation of PFAS contaminated environments are improved. At the same time, a positively charged surface enhances the attraction of negatively charged PFASs, thus leading to a higher reactivity toward reductive degradation by the sulfidated ZVI and/or the cathode upon reaching.

Preferably, the zerovalent metal used in the method described herein is coated with carbonaceous structures.

Alternatively, a bimetallic compound or a mixture of one or more zerovalent metals and/or one or more bimetallic compounds can be used in the method described herein.

The use of bimetallic compounds or mixtures has the advantage that the reactivity of the reductant can be tailored to the PFAS contaminants present in the contaminated environment and the effectiveness of the remediation process can be optimized.

Preferably, the anode and the cathode used in the method described previously are made of zerovalent metal. Such electrodes are readily available.

Preferably, the anode and the cathode are made of zerovalent iron. Such electrodes are readily available and relatively inexpensive.

Preferably, the reductant used in the method described previously is an aqueous dispersion of zerovalent iron featuring a particle size between 50 and 200 nm and/or a particle size between 10 and 350 μm and/or a granular iron with particle size larger than 500 μm and/or a concentration in solution between 0.5 and 100 g/L.

The term "particle size" as used herein refers to the particle size distribution D50, i.e. the value of the particle diameter at 50% in the cumulative distribution, which is also known as the median diameter or the medium value of the particle size distribution. Measurements of particle size and shape distributions can be performed by transmission electron microscopy according to ISO/DIS 21363.

The term "concentration in solution" as used herein refers to the dry weight of the zerovalent iron particles on a metal basis prior to dispersion in the liquid.

Aqueous dispersions of zerovalent iron are commercially available, relatively inexpensive and can be applied readily over the contaminated environment, e.g. by using suitable dosing pumps.

A particle size between 50 and 200 nm has the advantage that these relatively small particles afford a larger surface area for sorption, show enhanced mobility in the contaminated environment and faster reaction kinetics. A particle size comprised between 10 and 350 μm has the advantage that these relatively large particles are longer lasting. A particle size larger than 500 μm has the advantage that such particles are typically cheaper compared to their smaller-sized analogues, easier to remove from the remediated environment in ex situ applications, e.g. by sedimentation and filtration, and safer to use, i.e. they are not affected by bans or restrictions in certain countries like nanoparticles might be. A mixture of both small and large particles can be used to exploit the benefits of both particle size ranges in the same treatment.

A concentration of zerovalent iron particles in solution between 0.5 and 100 g/L has the advantage that the respective aqueous solutions feature an optimal cost-effectiveness for the remediation of PFAS contaminated environments and can be handled by ordinary equipment for dispersions.

Preferably, the number of cathodes used in the method described previously is different from the number of anodes.

The use of unequal numbers of anode and cathodes, e.g. a single anode surrounded by four cathodes, has the advantage that the electromigratory pathways of substances which are mobilized under the influence of the electric field can be controlled. This allows a larger area to be cleaned of contamination without having to reposition the electrodes in the environment to be remediated.

Preferably, the number of electrodes operating as cathodes in the method described herein is greater than the number of electrodes operating as anodes. This has the advantage of increasing the number of sites for the reduction of halogenated organic compounds, in particular PFASs.

Preferably, the method described herein further comprises the step of placing at least one membrane in the contaminated environment between at least one pair of said electrodes. Preferably, said at least one membrane is an ion-exchange membrane.

Surprisingly, it was found that the combination of an electrically conductive reductant, used in a method as disclosed herein, and a membrane through which the contaminants to be removed flow, in particular due to electrokinesis, contributes to a particularly high effectiveness and efficiency of the remediation process.

Preferably, each of said membranes is arranged substantially transversely to the main flow direction of the contaminated environment passing through the respective membrane. In one embodiment, such an arrangement prevents the compounds to be removed from simply flowing along and past the membrane and hence provides for an enhanced retention effect of the compounds to be removed. In another embodiment, such an arrangement of membranes is particularly advantageous if several membranes are to be connected in series in the form of a membrane cartridge. In this case, a parallel arrangement of membranes in such a membrane cartridge allows a particularly space-saving and compact design of the membrane cartridge. In yet another embodiment, the arrangement of the at least one membrane substantially transverse to the direction of flow of the compounds to be removed, as described above, is particularly useful for installations in closed spaces such as pipelines, plumbing and/or piping.

The object is further achieved by a kit for performing remediation of environments contaminated with halogenated organic compounds, in particular per- and polyfluoroalkyl substances, particularly for performing a method as described herein.

The kit comprises a plurality of electrodes, means for supplying DC power to said electrodes, at least one electrically conductive reductant, means for obtaining information indicative of the electrical resistance between said electrodes, means for bringing said reductant into close proximity to the contaminated environment, and means for controlling the assembled kit.

The term "kit" as used herein refers to an obvious arrangement of components for joint use that has to be assembled by the user and/or at the site of use to get the definitive product.

Preferably, said plurality of electrodes are made of zerovalent iron, said at least one electrically conductive reductant is an aqueous dispersion of zerovalent iron, said means for bringing the reductant into close proximity to the contaminated environment is an injection well and a dosing unit comprising a disperser, and said means for controlling the assembled kit is a control unit comprising a computing system capable of data storage and transmission and a user interface.

The advantage of such a kit is that it is cost effective, reliable, safe and easy to use.

Preferably, the means for supplying DC power in the kit described herein comprises a battery, a generator, a fuel cell or a power converter for a renewable energy source.

This allows the kit to be powered and operated even without the availability of a permanently installed power connection in remote locations.

Preferably, said battery is a rechargeable battery. A rechargeable battery represents a resource-saving variant of energy supply.

By using a generator or a fuel cell, the kit can be operated for an extended time period without the need for interrupting the method for switching batteries, which improves the overall efficiency of the method. Using a power converter for a renewable energy source, in particular solar or wind energy, renders the overall process more environmentally benign.

Preferably, said reductant in the kit described herein is zerovalent iron, particularly zerovalent iron particles with a particle size comprised between 50 and 200 nm and/or a particle size comprised between 10 and 350 μm and/or granular iron with a particle size larger than 500 μm.

This has the advantage that such zerovalent iron is relatively inexpensive and commercially available. The particles of the smaller size range afford faster kinetics and show enhanced mobility in the contaminated environment whereas the particles in the larger size range are longer acting. A mixture of both small and large particles can be used to exploit the benefits of both particle size ranges.

Preferably, the number of cathodes in the kit described herein is different from the number of anodes.

This has the advantage that electromigration of the reductant and/or other substances which are mobilized under the influence of the electric field can be controlled within the area covered by the electrodes used. This allows a larger area to be cleaned of contamination without having to remove and reinstall the electrodes in the environment to be remediated.

Preferably, the kit described previously comprises an equal number of cathodes and anodes or more cathodes than anodes. This way, the number of sites for reductive dehalogenation of organic compounds, in particular reduction of PFASs, is increased and the cleaning process can be accelerated.

In one embodiment, the kit according to the invention described herein additionally comprises a plurality of measuring electrodes.

A kit comprising a plurality of measuring electrodes enables to obtain information indicative of electrical resistances between an electrode and a measuring electrode placed near said electrode or between measuring electrodes.

Preferably, the kit described herein additionally comprises at least one membrane, preferably at least one ion-exchange membrane.

The object is further achieved by the use of a kit for remediation of environments contaminated with halogenated organic compounds, in particular per- and polyfluoroalkyl substances, as described previously, in particular in accordance with the method as described previously.

The invention is further explained in more detail by means of figures. Unless stated otherwise, like reference numerals are used to refer to the same or similar elements.

Figure 1B:
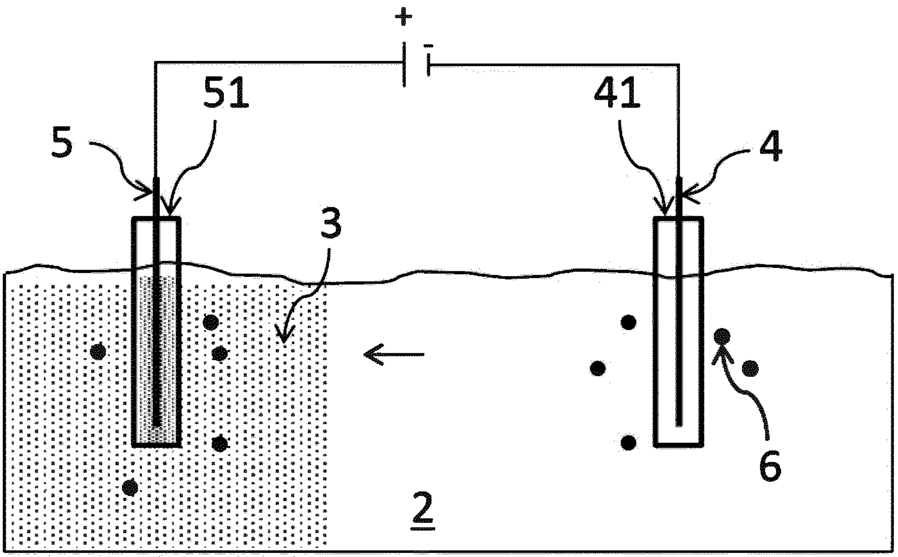
Figure 1C:
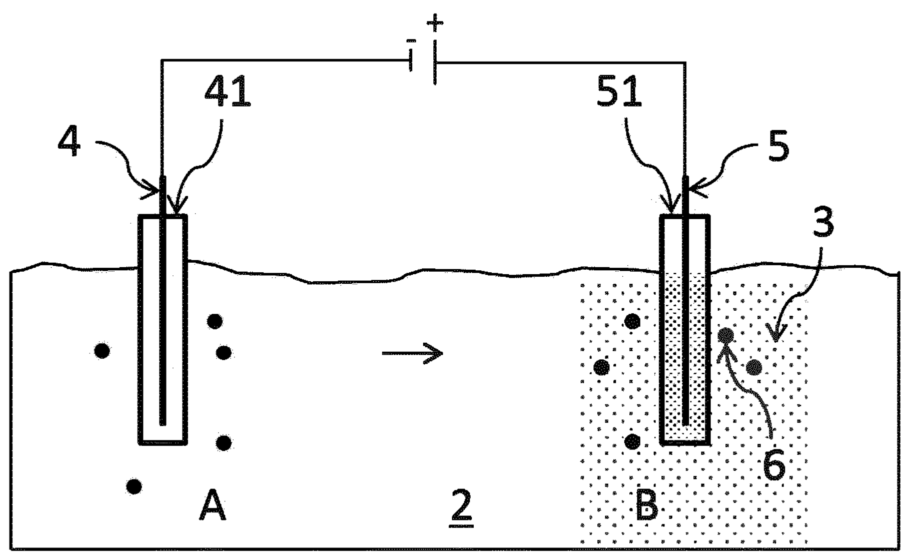
Figure 1D:
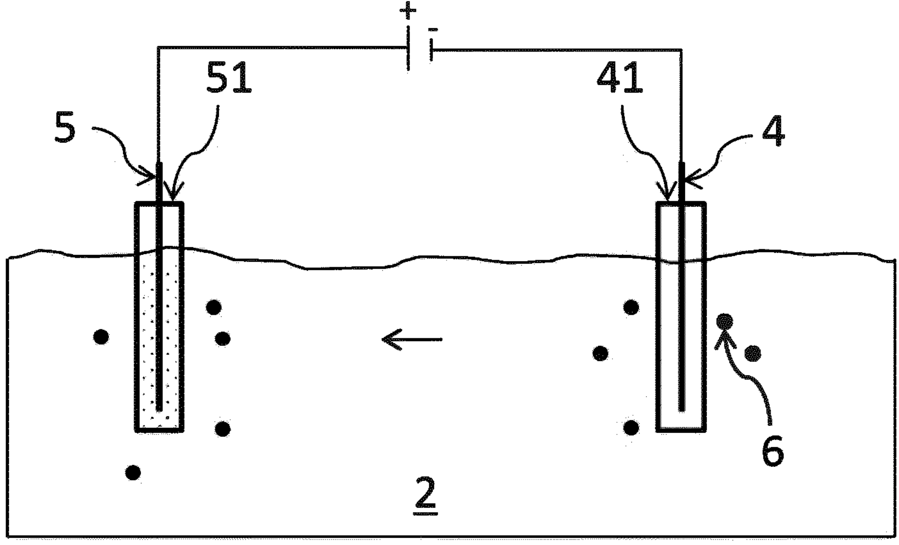

FIG. 1*a*: Schematic representation of a PFAS-contaminated environment at the start of the remediation method;

FIG. 1*b*: Schematic representation of the PFAS-contaminated environment after having performed the remediation method for a certain time;

FIG. 1*c*: Schematic representation of the PFAS-contaminated environment after having switched the polarity of the electrodes;

FIG. 1*d*: Schematic representation of the PFAS-contaminated environment after having switched the polarity of the electrodes again.

Figure 2A:
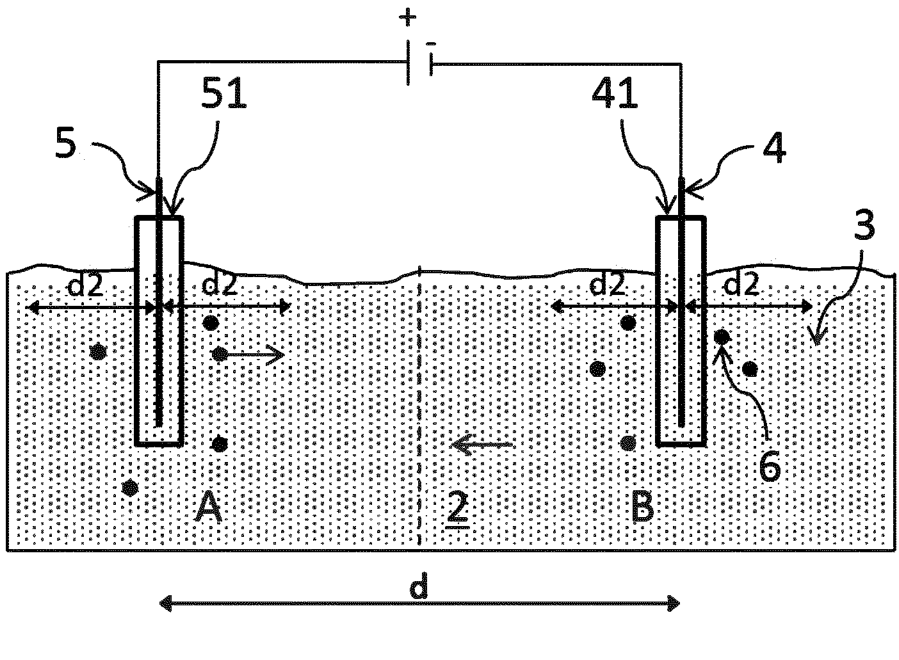
Figure 2B:
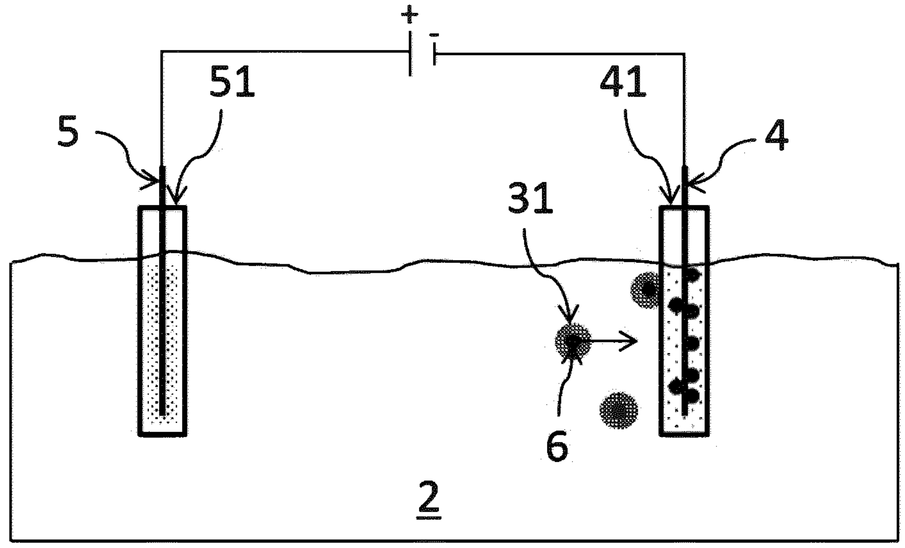
Figure 3:
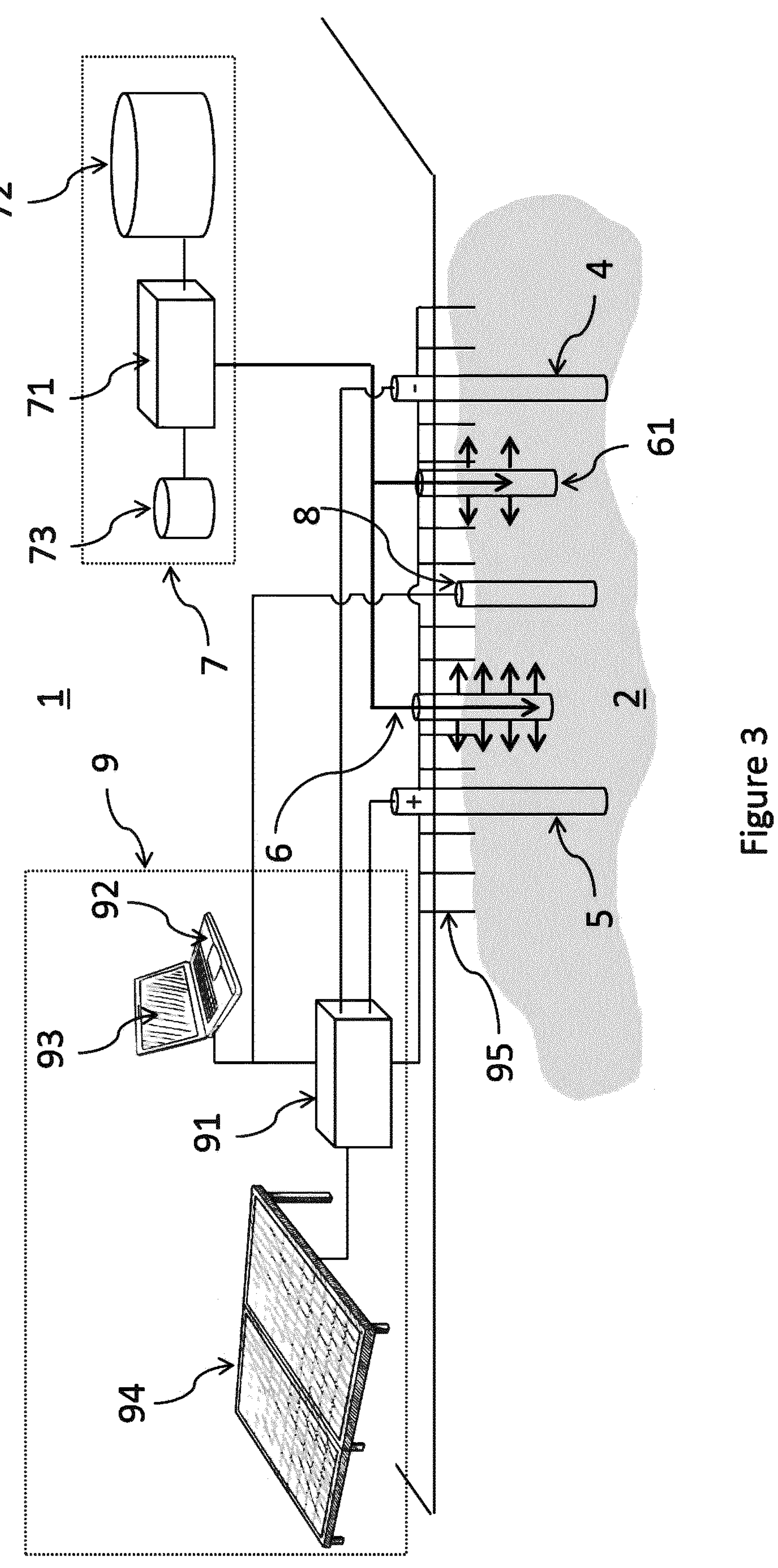

FIG. 2*a*: Schematic representation of a PFAS-contaminated environment at the start of the remediation method using an electromigrating reductant;

FIG. 2*b*: Schematic representation of the PFAS-contaminated environment after having performed the remediation method using an electromigrating reductant for a certain time;

FIG. 3: Schematic representation of a kit assembled and installed for carrying out a method according to the invention.

FIG. 1*a* shows a cross-section of an environment (2) contaminated with PFASs (3). It is understood that the method described here as a non-limiting example would apply equally to an environment (additionally) contaminated with other halogenated organic compounds. Two electrodes, i.e. one cathode (4) and one anode (5), are placed in the contaminated environment, whereby the cathode (4) is placed in a cathode well (41) and the anode (5) is placed in an anode well (51), respectively. Alternatively, the electrodes could also be introduced directly into the contaminated environment. The application of an electric DC current between the electrodes (4, 5) induces electromigration of charged species along the electric field lines towards oppositely charged electrodes. In the present example, the negatively charged PFASs (3) and other negatively charged halogenated organic compounds (not shown) migrate towards the anode (5). The direction of travel is exemplarily marked by the single arrow. The electrical current applied and the resulting electrical potential between the electrodes (4, 5) are used to calculate the cell's electrical resistance. The obtained data was analyzed and revealed a region of increased electrical resistance in the area between the two electrodes (4, 5). In the present example, the amount of reductant (6) added around the cathode is equal to the amount of reductant (6) added around the anode, i.e. the reductant (6) was distributed equally between the treatment zones surrounding the anode and the cathode. The reductant was introduced into the contaminated environment at a distance of less than d1 around each electrode, wherein d1 denotes a distance of 50 cm in this particular example. It is understood that once the reductant has been introduced into the contaminated environment, currents, the influence of the electric field, water flow, earth movements, diffusion of the reducing agent, or the like, can change the location of the reducing agent in the contaminated environment, so that the reducing agent can be found further away from the respective electrode than the location where it has been introduced into the contaminated environment.

FIG. 1*b* shows the cross-section referred to in FIG. 1*a* after having performed the remediation method for a certain time. Whereas the substantially non-migrating reductant (6) used in the present example largely remained at the respective points of injection, the negatively charged, mobile PFASs (3) and other negatively charged halogenated organics (not shown) migrated towards the anode (5). Upon passing the reductant (6) in the treatment zones, the contaminants are reduced as indicated by the weaker shading corresponding to PFASs (3) in the figure.

FIG. 1*c* shows the cross-section referred to in FIG. 1*b* after having switched the polarity of the electrodes. The new direction of travel of PFASs (3) and other negatively charged halogenated organics (not shown) towards the newly formed anode is again indicated by the single arrow. Upon passing the reductant (6) in the treatment zones, the contaminants are successively degraded as indicated by the hatching corresponding to PFASs (3) which is reduced even further in this figure.

FIG. 1*d* shows the cross-section referred to in FIG. 1*c* after having switched the polarity of the electrodes back again. The direction of travel of PFASs (3) and other negatively charged halogenated organics (not shown) is again marked by the single arrow. As expressed by the lower number of PFASs (3) and other halogenated organic contaminants (not shown) compared to the initial situation shown in FIG. 1*a*, the repeated passage of PFASs (3) and other negatively charged halogenated organic contaminants (not shown) through the treatment zones formed by the combination of electrodes (4, 5) and reductant (6) has led to a successive reduction in the amount of PFASs (3) and other negatively charged halogenated organic contaminants (not shown) present in the environment (2).

FIG. 2*a* shows a cross-section of a PFAS-contaminated environment (2) at the start of the remediation method using an electromigrating reductant (6). It is understood that the method described here as a non-limiting example would apply equally to an environment (additionally) contaminated with other halogenated organic compounds. One cathode (4) and one anode (5) are placed in the contaminated environment, whereby the cathode (4) is placed in a cathode well (41) and the anode (5) is placed in an anode well (51), respectively. Alternatively, the electrodes could also be introduced directly into the contaminated environment. The reductant (6) was brought into close proximity to the contaminated environment at a distance of less than d2 around said one cathode and said one anode, respectively, wherein d2 corresponds to a distance of 30 cm in this example. In the present example, the information indicative of the electric resistance between the cathode (4) and the anode (5) was obtained from the known voltage difference applied between the cathode (4) and the anode (5) and the measured average current through the anode (5) and the cathode (4), respectively. In order to reduce the overall resistance between the anode (5) and the cathode (4). The application of an electric DC current between the electrodes (4, 5) induces electromigration of charged species along the electric field lines towards oppositely charged electrodes. In the present example, the negatively charged PFASs (3) migrate towards the anode (5) and the reductants (6) migrate towards the cathode (4) as indicated by the respective single arrows.

FIG. 2*b* shows a cross-section referred to in FIG. 2*a* after having performed the remediation method for a certain time. PFASs have been adsorbed (31) by the Reductant (6) and reduced and/or transported in the electric field towards the cathode (4) where reduction of PFASs occurred as well. A portion of negatively charged PFASs, which have not been trapped by the reductant (6), is concentrated around the positively charged anode (5). Upon switching the polarity of the electrodes (not shown), these PFASs can adsorb onto the reductant (6) which is now migrating into the opposite direction, i.e. towards the newly formed cathode. The switching of the polarity can be repeated multiple times until a targeted PFAS-concentration is obtained in the remediated environment.

FIG. 3 provides a schematic representation of the components of a kit for performing a method according to the invention. The kit (1) comprises a cathode (4) and an anode (5) each in fluid communication with an aquifer (2) contaminated with halogenated organic compounds. A photovoltaic panel (94) provides electric power for the controlling means (9), which comprises a control unit (91) electrically connected to the cathode (4) and the anode (5) and configured to apply an electric field between said electrodes. A series of electrodes (95) is used to measure the electric field produced by the electric DC current applied between said electrodes (4, 5). The treatment region is defined by the area between the cathode (4) and the anode (5) and electromigration occurs along the electric field lines between the anode (5) and the cathode (4). The reductant (6) is brought into close proximity to the contaminated environment via an injection well (61) connected to a dosing unit (7), which comprises a disperser (71), a water tank (72) and a reductant reservoir (73). The kit (1) further comprises a sensor (8) in fluid communication with the aquifer, whereby the sensor (8) is electrically connected to the controlling means (9). It is understood that the kit can comprise more than one sensor (8) in fluid communication with the aquifer and electrically connected to the controlling means (9), depending on the chemical and/or physical properties to be measured. The system is operated by a computing system (92) with a user interface (93).

The invention claimed is:

1. A method for remediation of environments contaminated with halogenated organic compounds, the method comprising the steps of:
placing a plurality of electrodes in contaminated environment;
supplying an electric direct current through said electrodes;
obtaining information indicative of electrical resistances between said electrodes;
analyzing said information to detect whether at least one of said electrodes introduces a lower electric current into the contaminated environment compared to the remaining ones of said electrodes;
providing at least one electrically conductive reductant for halogenated organic compounds; and
bringing said reductant into or in close proximity to the contaminated environment in response to said detection such that the electrical resistance to the contaminated environment of at least one of said electrodes identified to introduce a lower electric current into the contaminated environment is decreased.

2. The method according to claim 1, wherein said reductant is brought into or in close proximity to the contaminated environment at a distance of less than 50 cm, from at least one of said electrodes identified to introduce a lower electric current into the contaminated environment compared to the remaining ones of said electrodes.

3. The method according to claim 1, further comprising the steps of:
placing a plurality of measuring electrodes in the contaminated environment;
measuring a voltage drop either between said measuring electrodes or from each of the measuring electrodes to its respective nearest electrode, or measuring a voltage drop between said measuring electrodes and from each of the measuring electrodes to its respective nearest electrode; and
obtaining the information indicative of electrical resistances from the measured voltage drops.

4. The method according to claim 1, further comprising the steps of:
determining at least one of electric field lines and/or equipotential lines between at least one of the electrodes and said measuring electrodes;
one or both of switching the polarity of at least one of said electrodes and placing at least one additional electrode in the contaminated environment based on at least one of said determined electric field lines and said equipotential lines.

5. The method according to claim 1, further comprising the step of:
measuring the pH of the environment within an effective range of the electrodes.

6. The method according to claim 5, further comprising the step of adding a pH adjusting agent within the effective range of the electrodes.

7. The method according to claim 1, further comprising the steps of:
providing at least one monitoring well in the contaminated environment; and
providing at least one sensor per said at least one monitoring well, wherein said sensor is capable of measuring one or both of at least one chemical property and at least one physical property.

8. The method according to claim 1, wherein the reductant comprises a zerovalent metal, a bimetallic compound or a mixture of at least one of one or more zerovalent metals and one or more bimetallic compounds.

9. The method according to claim 1, wherein the plurality of electrodes placed in the contaminated environment comprises at least one cathode and at least one anode, and wherein the anode and the cathode are made of zerovalent metal.

10. The method according to claim 1, wherein said reductant is an aqueous dispersion of zerovalent iron, wherein said aqueous dispersion has at least one feature selected from the group consisting of a particle size between 50 and 200 nm a particle size between 10 and 350 μm granular iron with a particle size larger than 500 μm and concentration in solution between 0.5 and 100 g/L.

11. The method according to claim 1, wherein the contaminated environment is selected from the group consisting of wastewater, groundwater, industrial effluent, sediment, soil, hazardous liquid waste, environmental runoff and processing byproduct or combinations thereof.

12. The method according to claim 1, further comprising the step of:
placing at least one membrane in the contaminated environment between at least one pair of said electrodes.

13. The method according to claim 12, wherein each of said at least one membranes is each arranged substantially transversely to a main flow direction of the contaminated environment passing through the respective membrane.

14. The method according to claim 12, wherein said at least one membrane is at least one ion-exchange membrane.

15. A kit for performing a method according to claim 1 for remediation of environments contaminated with halogenated organic compounds, wherein the kit comprises:
a plurality of electrodes;
means for supplying DC power to said plurality of electrodes;
at least one electrically conductive reductant for halogenated organic compounds;
means for obtaining information indicative of the electrical resistance between said electrodes;
means for bringing said reductant into close proximity to the contaminated environment;
means for monitoring said information indicative of electrical resistances between the electrodes; and
means for controlling the assembled kit.

16. The kit according to claim 15, wherein said means for supplying DC power is selected from the group consisting of a battery, a generator, a fuel cell and a power converter for a renewable energy source.

17. The kit according to claim 15, wherein said reductant is zerovalent iron.

18. The kit according to claim 15, wherein the kit additionally comprises a plurality of measuring electrodes.

19. The kit according to claim 15, wherein the kit additionally comprises at least one membrane.

20. The method according to claim 1, wherein said information indicative of electrical resistances between said electrodes is obtained at several points in time during remediation.

* * * * *